United States Patent [19]

Tarvin et al.

[11] Patent Number: 4,972,347
[45] Date of Patent: Nov. 20, 1990

[54] METHOD AND APPARATUS FOR DETERMINING THE CORRECT TOOL DIMENSIONS FOR A THREE DIMENSIONAL TOOL MOUNTED ON A MANIPULATOR

[75] Inventors: Ronald L. Tarvin; Keith R. Wehmeyer, both of Cincinnati, Ohio

[73] Assignee: Cincinnati Milacron Inc., Cincinnati, Ohio

[21] Appl. No.: 255,507

[22] Filed: Oct. 11, 1988

[51] Int. Cl.$^5$ .............................................. G05B 19/42
[52] U.S. Cl. ................................ 364/474.28; 364/513; 364/474.34; 901/3; 318/568.13
[58] Field of Search .............. 364/513, 474.28, 474.34, 364/474.35, 474.36, 474.37; 318/574, 632, 568.19, 568.23, 568.23, 568.13; 901/3, 14, 16, 29

[56] References Cited

U.S. PATENT DOCUMENTS

| | | | |
|---|---|---|---|
| 3,920,972 | 11/1975 | Corwin, Jr. et al. | 235/151.11 |
| 4,538,047 | 8/1985 | Nakano et al. | 219/125.1 |
| 4,598,380 | 7/1986 | Holmes et al. | 318/568.23 |
| 4,706,000 | 11/1987 | Kishi et al. | 318/568.19 |
| 4,722,063 | 1/1988 | Yasukawa et al. | 364/513 |
| 4,771,222 | 9/1988 | Nakashima et al. | 364/513 |
| 4,808,063 | 2/1989 | Haley | 364/513 |
| 4,816,733 | 3/1989 | Sakakibara et al. | 318/632 |
| 4,835,710 | 5/1989 | Schnelle et al. | 364/513 |
| 4,853,603 | 8/1989 | Onoue et al. | 364/513 |

OTHER PUBLICATIONS

"Tool Definition Helps Robots Perform", Gerstenberger, Michael, *Robotics World*, Nov./Dec. 1988.

*Primary Examiner*—Jerry Smith
*Assistant Examiner*—Paul Gordon
*Attorney, Agent, or Firm*—Frost & Jacobs

[57] ABSTRACT

A method and apparatus by which correct tool dimensions for a three dimensional tool mounted on a manipulator can be determined. The manipulator operator inputs initial values for the tool dimensions into the manipulator control in the teach mode. Having established a target point within the manipulator's working volume, the operator, by means of teach pendant, causes the tool center point to approach and touch the target point from four different directions, at least one of which is noncoplanar with respect to the other three. For each approach point coordinates X, Y, Z, D, E, R are entered into the control. The control thereafter executes an analytical procedure including a major iteration loop which calculates the coordinates of the target point. In a first minor iteration loop within the major iteration loop updated tool dimensions are derived. In a second minor iteration loop within the major iteration loop new coordinates for the tool center point approach points are calculated. The differences between the average of the calculated coordinates of the target point and the average of the calculated coordinates of the approach points are determined. If the differences fall within operator determined limits the tool dimensions calculated in the first minor iteration loop are used. If not, the major iteration loop is repeated using the calculated values the tool dimensions and approach point coordinates of the previous iteration until they do, or until a predetermined number of iterations has been performed, whereupon an error signal is displayed.

12 Claims, 6 Drawing Sheets

METHOD AND APPARATUS FOR DETERMINING THE CORRECT TOOL DIMENSIONS FOR A THREE DIMENSIONAL TOOL MOUNTED ON A MANIPULATOR

TECHNICAL FIELD

The invention relates to a method and apparatus for determining the correct tool dimensions for a three dimensional tool mounted on an manipulator, and more particularly to such a method combining experimental and analytical steps so that crude measurements need not be relied upon.

BACKGROUND ART

In its most usual form, a robot or manipulator comprises a series of arm segments terminating in a wrist assembly. The wrist assembly supports a face plate to which an appropriate tool is affixed. The nature of the tool will depend upon the work to be performed by the manipulator.

The manipulator is provided with a control. The control is programmed to cause the manipulator to move the tool along a programmed path of travel and to execute programmed functions associated with programmed locations along that path of travel.

In order for the manipulator to perform operations correctly, it is necessary that the manipulator move the designated center point of the tool accurately along the programmed path of travel. Some operations require greater accuracy than others. If the manipulator supported tool is a welding torch, for example, it is desirable, and generally necessary, that the tool center point (the tip of the welding tool) be moved along the seam to be welded with a high degree of accuracy.

The tool dimension with which the present invention is concerned may be defined as the distance between the center point of the manipulator wrist and the designated center point of the tool. This is a vector distance made up of components L, B and A, as will be described hereinafter.

A program defining a cycle of operation of the manipulator consists of coordinates of locations defining end points of manipulator motion. So long as the manipulator and the tool used to teach the program are used to execute the program in the same location in which it is taught, the operation will be performed with the accuracy inherent in the manipulator and control combination. If, however, it is necessary to perform the program relative to a shifted workpiece or using a replacement tool, or if the program to be executed is not created using the manipulator and tool with which it is to be executed, then inaccuracy in the specification of tool dimensions can result in inaccuracy in the performance of the cycle of operation. This is a consequence of the use of the operator specified tool dimensions in the calculations involved in effecting manipulator motion. In the case of program alignment for a shifted workpiece, any difference between the operator specified tool dimensions and the actual tool dimensions used in performing alignment can result in creating incorrect coordinate corrections for aligning the program with the actual workpiece location. Likewise, a difference between the actual tool dimensions and the operator specified tool dimensions at the time of program teaching can result in production of location coordinates which are not properly compensated by new tool dimensions. The need for accurate tool dimensions imposes a burden on the manipulator user to ascertain those dimensions prior to program creation, in the case of teaching, or prior to program execution, in the case of programs created from a source other than the manipulator with which the program is to be executed.

Heretofore, prior art workers have generally determined the tool dimensions through the use of a scale or other direct measurement means. By virtue of the complex geometry of some manipulator tools, such measurements frequently yield rough approximations of the true tool dimensions. This, in turn, leads to undesirable or even unacceptable tool movement during the manipulator's controlled path operation.

The present invention is based upon the development of a procedure for more accurately determining the correct dimensions of any three dimensional manipulator tool. The procedure is in part empirical and in part analytical and can readily be performed by a manipulator operator of ordinary skill in the art.

DISCLOSURE OF THE INVENTION

In accordance with the invention there is disclosed a method and apparatus, partly experimental and partly analytical, for determining the correct tool dimensions for a three dimensional tool mounted on a manipulator. To perform the experimental part of the procedure, the manipulator operator establishes a target point within the manipulator's working volume. The operator inputs initial values for the tool dimensions to the control in the teach mode. It is not necessary for these initial values to be accurately determined and, in fact, initial values of zero are acceptable. Using the teach pendant, the operator causes the tool center point to approach the target point from four different directions, causing the tool center point to actually touch the target point in each instance. At least one of the four approach vectors should be noncoplanar with respect to the others. For each of the four approaches, the operator causes the coordinates (X, Y, Z) of the tool center point and the orientation angles of the tool attitude (D, E, R) to be stored.

Following this experimental procedure, the manipulator control executes an analytical procedure to determine the actual tool dimensions. This procedure involves an iterative approximation of tool dimensions by mathematical techniques. The procedure includes a test to determine whether an acceptable solution has been found within eight attempts. If not, an error message is displayed and the operator may then repeat the empirical procedure.

The analytical procedure includes a major iteration loop which calculates coordinates of the target point using the stored tool center point coordinates in the solution of simultaneous equations derived from a function defining a sphere having the target point at its center.

In a second portion of the major iteration loop, constituting a first minor iteration loop, updated tool dimension values are derived by determining the wrist coordinates at the manipulator wrist center point using the target point coordinates from the first portion of the major iteration loop and the most recently developed values of the tool dimensions. A third portion of the major iteration loop, constituting a second minor iteration loop, calculates the new coordinates for the tool center point approach points using the calculated coordinates of the wrist center point, and the tool dimensions. Thereafter, the differences between the target point coordinates obtained from the first portion of the major iteration loop and the average of the tool center point approach point coordinates derived from the second minor loop are compared. If these comparisons fall within an operator determined limit, it is known that the tool dimensions derived in the first minor loops are valid. If the comparison does not fall within the user determined limit, the major iteration loop is repeated.

The major iteration loop is set up to be executed a maximum of eight times. If the set of differences do not compare within the user defined limit after eight executions of the major iteration loop, the procedure is terminated and an error message is displayed.

DETAILED DESCRIPTION OF THE INVENTION

Figure 1:
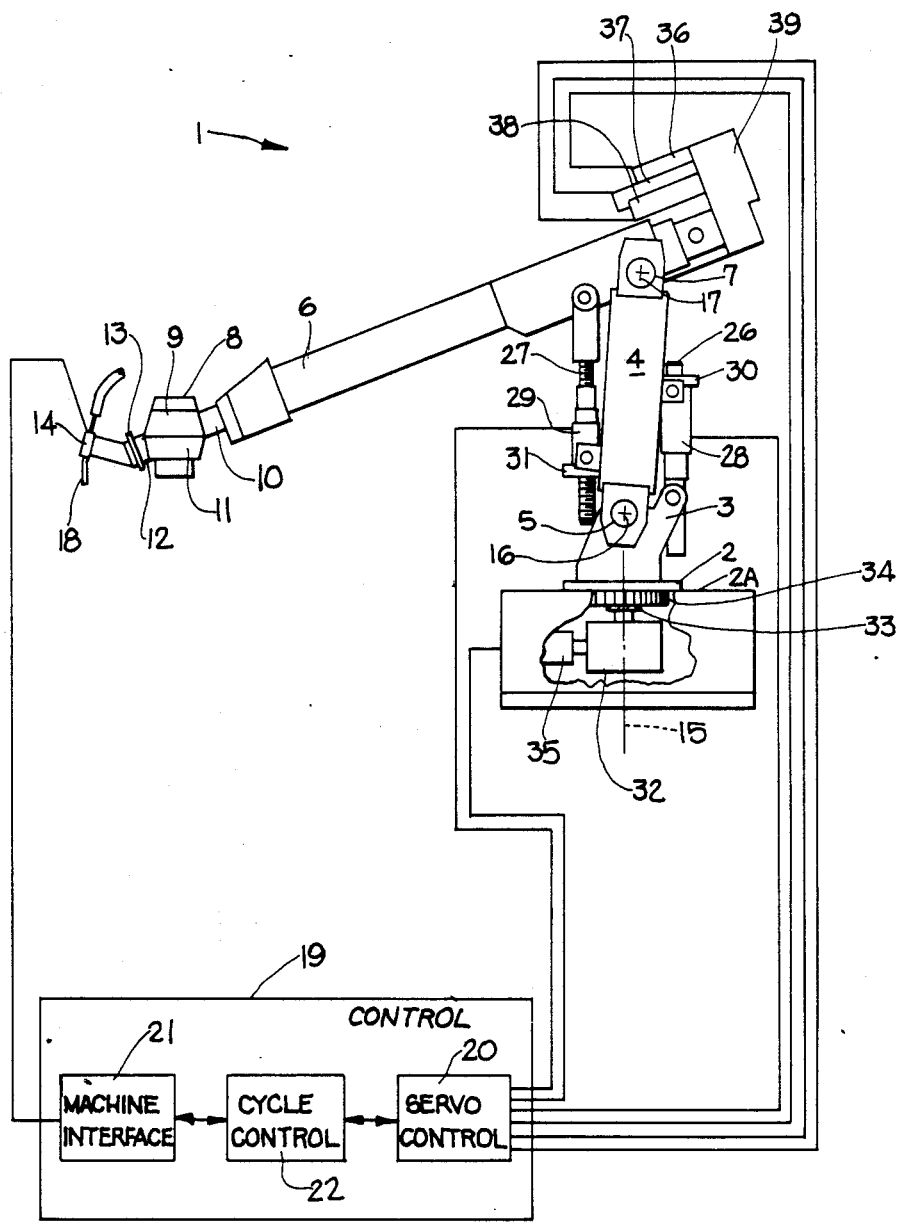
FIG. 1 is a simplified, diagrammatic representation of an industrial manipulator and its control.

For a thorough understanding of the method of determing the manipulator tool dimensions of the present invention, it will be necessary to describe an exemplary manipulator and its control. To this end, FIG. 1 illustrates a manipulator corresponding to those manufactured by Cincinnati Milacron Inc., the assignee of the present invention. The manipulator shown is exemplary only, and the method of the present invention can be applied to any appropriate manipulator. While the detailed description of the preferred embodiment will necessarily reflect the actual implementation, such detail should not be construed as limitations on the present invention as defined in the appended claims.

Referring to FIG. 1, an exemplary robot or manipulator is generally indicated at 1. The manipulator 1 comprises a plate 2 rotatably supported on base 2A and supporting upstanding shoulder member 3. An upper arm 4 is pivotally affixed to shoulder member 3 at shoulder pivot 5. A forearm 6 is pivotally attached to upper arm 4 at elbow pivot 7.

At its free forward end, the forearm 6 supports a wrist 8. As is known in the art, the wrist 8 comprises a first segment 9 having an integral shaft portion 10 rotatably supported within forearm 6 and having an axis parallel to or coincident with the longitudinal center line of forearm 6. Wrist 8 further comprises a second segment 11 rotatively mounted on first segment 9 and having an integral shaft portion 12. At the free end of shaft 12 is a face plate 13 which rotates about an axis through its center. Affixed to face plate 13 there is a tool 14. The tool 14 can be any tool adequately described by no more than three dimensions and, for purposes of an exemplary showing, is illustrated as being a welding tool.

The manipulator 1 is so constructed that motion of its members describe axes of rotation. The first axis is the vertical axis shown in broken lines at 15 and defined by rotation of plate 2 and shoulder member 3. The upper arm 4 rotates about horizontal shoulder axis 16 through the center of shoulder pivot 5. The forearm 6 rotates about the horizontal elbow axis 17 extending through the center of pivot 7.

Wrist 8 provides three more axes of rotation. The first is rotation of segment 9 about the axis of shaft 10. The second is rotation of segment 11 about an axis perpendicular to the abutting surfaces of segments 9 and 11. The third comprises the axis about which face plate 13 rotates.

Rotations about base axis 15, shoulder axis 16, and elbow axis 17 define the operating envelope of the center point 18 of tool 14. Rotations of wrist segment 9, wrist segment 11, and face plate 13 about their respective axes control orientations of the tool 14 at the programmed locations in accordance with programmed orientation angles.

The manipulator control is diagrammatically indicated at 19. Each of the six axes of motion is servo controlled by connection of command and feedback signals to servo control 20 of control 19. Operation of welding tool 14 is accomplished by a machine interface 21 which responds to the programmed cycle of operation controlled by the cycle control 22. The cycle control 22 operates upon stored location, velocity and function data to produce control signals for the servo control 20 and the machine interface 21. In this particular exemplary instance, the tool 14 being a welding torch, the control of the welding process is effected through the machine interface in response to stored function signals.

Rotations of the upper arm 4 and the forearm 6 about their respective axes are achieved by linear motions of screws 26 and 27 through nuts 28 and 29, respectively. Rotation of the nuts 28 and 29 is imparted through pulleys 30 and 31, respectively, by drive motors not shown. Rotation of plate 2 and shoulder member 3 is accomplished through transmission 32 driving pinion 33 which, in turn, drives ring gear 34 affixed to plate 2. The drive to transmission 32 is provided by motor 35.

Rotation of wrist segments 9 and 11 and face plate 13 is accomplished through torque tubes (not shown) within forearm 6 and driven by motors 36, 37 and 38 through transmission 39. Position signals for each movable manipulator member are produced by position transducers (such as resolvers) which may be mechanically driven by motion of the manipulator movable members, themselves, or the drive motors therefor.

Figure 2:
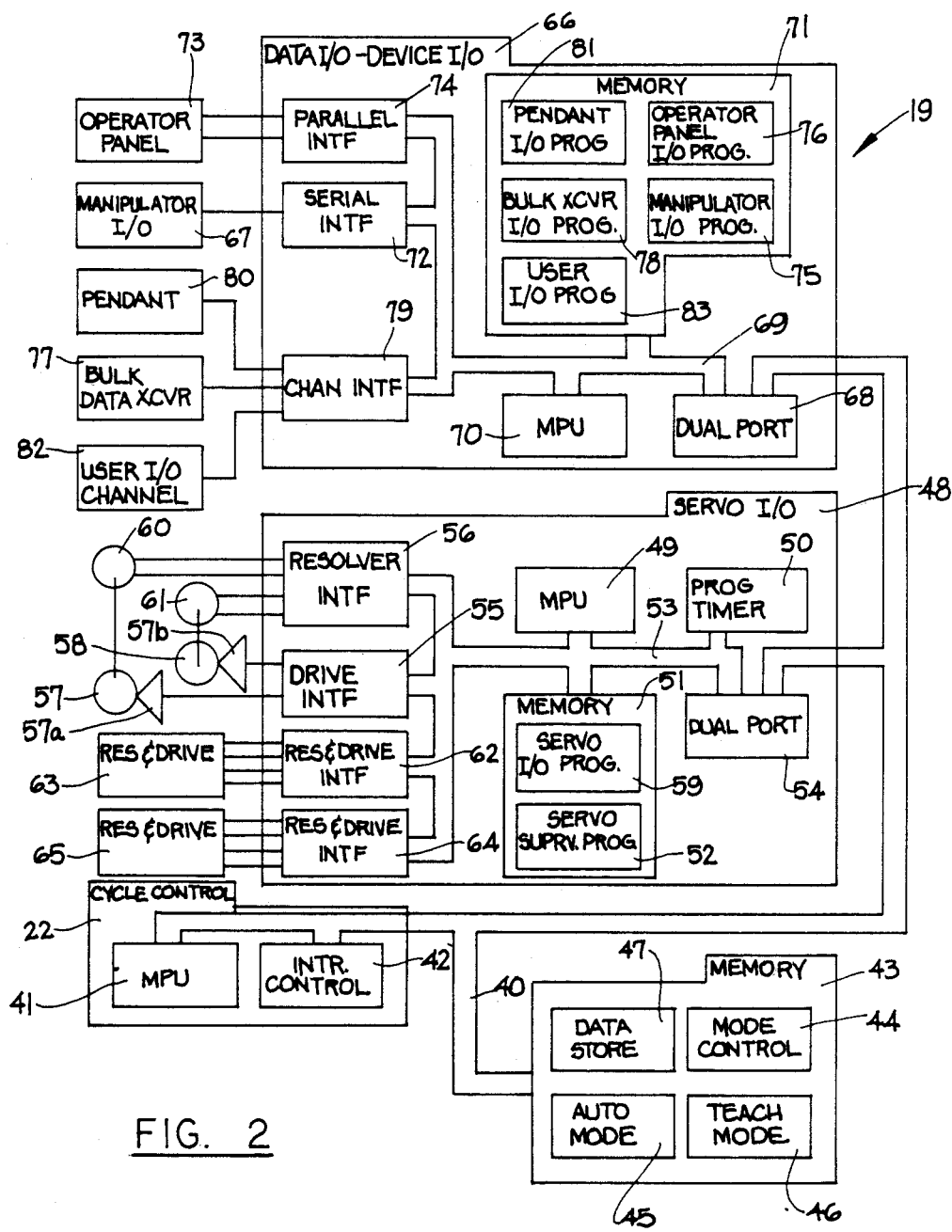
FIG. 2 is a block diagram of the control of FIG. 1.

Reference is now made to FIG. 2 which constitutes a block diagram for the control 19 of FIG. 1. The control 19 is implemented using a plurality of microprocessors communicating through a common bus 40. Applicants have chosen the commercially available 80186 microprocessor produced by Intel Corporation. It will be understood by those skilled in the art that other appropriate general purpose digital computers could be used to implement the control algorithms of the manipulator.

Cycle control 22 includes a microprocessor 41 and an interrupt control 42, both tied directly to the system bus 40. Operating system programs executed by microprocessor 41 are stored in memory 43 and include programs identified as mode control 44, auto mode 45, and teach mode 46. Data defining the user specified locations, velocities and functions are stored in data store 47. Memory 43 is connected directly to system bus 40. The set of programs identified as auto mode 45 is used by microprocessor 41 to execute the cycle of operation defined by the data stored in data store 47. Execution of the auto mode programs is carried out by microprocessor 41 repetitively until execution is interrupted by an interrupt signal processed by interrupt control 42.

Servo control 20 (FIG. 1) is shown at 48 in FIG. 2 and includes a servo supervisor which processes servo command signals produced by cycle control 22 and the servo input/output modules to be described, and associated with the actual control of the manipulator axis drive motors. The servo supervisor comprises a microprocessor 49, a programmable timer 50 and a local memory 51 which contains the servo control process programs 52. Servo interrupt signals are periodically produced by the programmable timer 50. The period between interrupt signals defines the interval of each iteration of path control procedures executed by cycle control 22. The elements comprising the servo supervisor receive manipulator axes command signals representing increments of motion of the manipulator relative to its axes of rotation to be effected during the iteration interval. These manipulator axis command signals are processed by the servo supervisor to produce servo command signals defining sub-increments for each of the manipulator axes effective for sub-divisions of the iteration interval. The servo command signals are distributed to the servo input/output modules at predefined sub-intervals of the iteration interval. The servo input/output modules use the servo command signals and feedback signals produced by position transducers to control the manipulator axes drive motors. It will be noted that elements 49, 50 and 51 are connected to a local bus 53 which, in turn, is connected to the system bus 40 through dual port memory 54.

Servo input/output is accomplished by microprocessor 49, and memory 51, through drive interface circuitry 55, and manipulator axis position measuring transducer interface 56. These elements are interconnected by local bus 53. Microprocessor 49 controls manipulator axis drive motors 57 and 58 through amplifiers 57a and 57b in response to the servo command signals and the feedback signals according to servo input/output programs 59 stored in memory 51. Each manipulator axis servo command signal is compared to the corresponding current position signal as defined by position transducer 60 or 61 to produce a position error signal which is then applied to the drive interface circuitry 55 to produce a drive control signal for application to the associated manipulator axis drive motor.

It will be noted that the block diagram of FIG. 2 illustrates servo input/output interfaces represented by blocks 62 and 64. It will be understood that each of blocks 62 and 64 represent both a driver interface circuitry similar to drive interface circuitry 55 and a machine axis position measuring transducer interface similar to that shown at 56. It will further be understood that each of blocks 63 and 65 represents two drive motors and an amplifier and a resolver associated with each. Servo command signals represent increments of manipulator axis motion to be effected within a few milliseconds. By contrast, the manipulator axis command signals represent increments of manipulator member motion to be effected within the iteration interval of 10 to 20 milliseconds.

In addition to the generation of the manipulator axis command signals, cycle control 22 controls the execution of functions represented by input signals and associated with operation of the tool 14 (FIG. 1) to be performed at programmed locations. Function commands are stored with the program data in data store 47 and are executed in accordance with function execution subroutines associated with the auto mode programs 45. Control of manipulator functions is effected through input/output devices, such as limit switches, push buttons, relays and solenoids. The manipulator input/output devices are directly controlled by the data input-/output-device input/output board 66 in cooperation with the machine input/output interface circuitry 67. Data is transferred to and from the system bus 40 through dual port memory device 68. The dual port memory device 68 is connected to the local bus 69 of board 66. Operation of board 66 is controlled by the local microprocessor 70 connected to bus 69 which executes programs stored in local memory 71.

Connection of the manipulator input/output interface circuitry 67 to board 66 is accomplished through a serial interface circuit 72. A control cabinet operator panel 73 is connected by parallel lines to a parallel interface circuit 74. Monitoring and control of the interface circuits 72 and 74 are accomplished by the microprocessor 70 in response to respectively the manipulator input-/output program 75 and the operator panel input/output program 76 stored in local memory 71. Current conditions of the manipulator input/output devices are reflected in device status signals transferred from the panel 66 through the dual port memory device 68 to the cycle control 22. Function command signals produced by cycle control 22 in accordance with the stored program of operation are transferred over system bus 40 through dual port 68 and ultimately to the appropriate manipulator input/output interface device by the serial interface 72.

Program data may be exchanged between data store 47 of memory 43 and a bulk data store through a bulk data transceiver 77. Examples of a bulk data store include serial tape and data disk devices. Data is exchanged by microprocessor 70 operating in response to the bulk data transceiver input/output program 78 stored in memory 71. Data is transferred to and from the bulk data transceiver 77 through a serial channel interface 79 to the local bus 69 and through the dual port memory device 68 connected to system bus 40.

Another data input/output device, the teach pendant 80, is associated with the execution of teach mode programs 46 by the cycle control 22. Location and function data defining a programmed cycle of operation may be generated by an operator using the teach pendant 80. Pendant 80 is controlled by pendant I/O program 81 of memory 71. Pendant I/O program 81 is executed by the local microprocessor 70. This pendant permits manual operation of manipulator 1 and the storage of location and function data in data store 47. As with other data input/output devices, data is transferred to and from pendant 80 through the serial channel interface 79, local bus 69, dual port memory device 68, and system bus 40. The operator is able to cause motion of the manipulator by commands for motion presented by local microprocessor 70 to the dual port 68. Cycle control microprocessor 41 senses that information in dual port 68 via bus 40 and effects the commanded coordinate increments and communicates them to servo I/O system 48. Motion of this type takes place in a manner similar to the automatic cycle 45, but it takes place only when the cycle control 22 is running the teach mode program 46 of memory 43. As the present invention is performed in the teach mode of operation, additional details of the operation of the manipulator in the teach mode may be found in U.S. Pat. No. 3,920,972.

A final input/output device is the user I/O channel 82. The user data I/O program 83 residing in memory 71 is a simple routine which permits the user I/O channel 82 to be under direct control of the cycle control microprocessor 41. When it is desired for the cycle control microprocessor to communicate with external devices, it does so through the user I/O channel. The external device may be a dedicated device such as a vision system, a sensor, a line printer, or the like. For example, the cycle control microprocessor 41 can print out what is in data store 47 of memory 43 in a human readable format.

Figure 3:
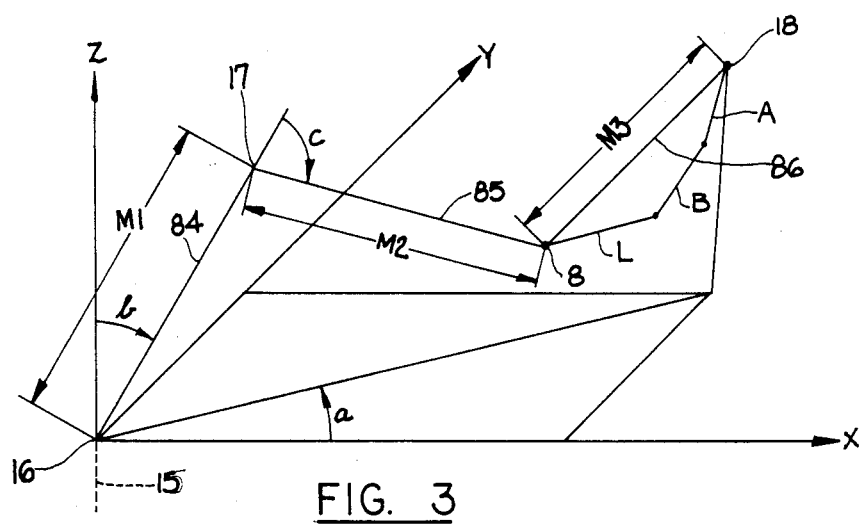
FIG. 3 is a schematic representation of the manipulator shown in the manipulator coordinates.

A schematic representation of the manipulator can be useful in describing the control algorithms of the present invention. Such a schematic representation is depicted in FIG. 3. In FIG. 3 a first line segment 84 is shown corresponding to the manipulator upper arm 4 of FIG. 1. A second line segment 85 is shown corresponding to the manipulator forearm 6 of FIG. 1. The shoulder axis 16, elbow axis 17, wrist 8 and the tool center point 18 of FIG. 1 are also indicated in FIG. 3. The wrist 8 and tool center point 18 are shown joined by line segment 86.

The line segments 84, 85, and 86 of FIG. 3 are dimensioned respectively with lengths M1, M2, and M3. Length M1 represents the length of the manipulator upper arm 4 between shoulder axis 16 and elbow axis 17. The length M2 represents the length of manipulator forearm 6 from the elbow axis 17 to the center of wrist 8. Finally, length M3 represents the distance between the center of wrist 8 and the center point 18 of tool 14, i.e, the tool dimension.

In FIG. 3, the line segments 84, 85, and 86 are shown in relation to the rectangular coordinate system X, Y, Z of the manipulator 1. The manipulator coordinate system is frequently referred to as the manipulator "world" coordinate system. The origin of this coordinate system corresponds to a point on the manipulator 1 located at the intersection of vertical base axis 15 and horizontal shoulder axis 16. It will be noted from FIG. 3 that the vertical Z axis of the manipulator coordinate system is coaxial with base axis 15. When the manipulator 1 is in its "home" position, the horizontal Y axis is coaxial with shoulder axis 16 and the horizontal X axis is perpendicular to and passes through the intersection of base axis 15 and shoulder axis 16.

A second coordinate system is used in association with the manipulator. This coordinate system, L, B, and A, has its origin at the center point of wrist 8. The center point of wrist 8 is defined as the intersection of its three axes of rotation. This second coordinate system is frequently referred to as the "hand" coordinate system. The line segment 86 of FIG. 3, representing the distance M3 between the center point of wrist 8 and the center point 18 of tool 14 comprises a vector in the hand coordinate system $T_D$ with components L, B, and A.

At any given instant in time the three orientation angles define the orientation of the hand axis system L, B, A to the manipulator axis system X, Y, Z. As a consequence, and as is known in the art, transformations from the manipulator coordinate system to the hand coordinate system and from the hand coordinate system to the manipulator coordinate system can be performed and stated as follows:

$$\underbrace{\begin{bmatrix} X \\ Y \\ Z \end{bmatrix}}_{\text{manipulator}} = \begin{bmatrix} X_w \\ Y_w \\ Z_w \end{bmatrix} + [Q] \underbrace{\begin{bmatrix} L \\ B \\ A \end{bmatrix}}_{\text{hand}}$$

$$\underbrace{\begin{bmatrix} L \\ B \\ A \end{bmatrix}}_{\text{hand}} = [Q]^{-1} \left\{ \underbrace{\begin{bmatrix} X \\ Y \\ Z \end{bmatrix}}_{\text{manipulator}} - \begin{bmatrix} X_w \\ Y_w \\ Z_w \end{bmatrix} \right\}$$

Where, [Q] represents an appropriate transformation matrix and $$X_w \\ Y_w \\ Z_w$$

is a vector from the origin of the manipulator (world) coordinate system to the origin of the hand coordinate system.

Returning to FIG. 3, rotation of the manipulator about its base axis 16 is dimensioned by the magnitude of angle a. Rotation of the manipulator upper arm is dimensioned by the magnitude of angle b. Rotation of the manipulator forearm is dimensioned by the magnitude of angle c. It will be noted that angle c is measured from the center line of the manipulator upper arm. It will be appreciated by those skilled in the art with reference to FIG. 3 that the lengths M1 and M2 and the magnitudes of angles a, b, and c completely define the location of the center point of wrist 8. If line segment 86 were coaxial with line segment 85, then lengths M1, M2, and M3, together with the magnitudes of angles a, b, and c, would completely define the location of the tool center point 18.

Figure 4:
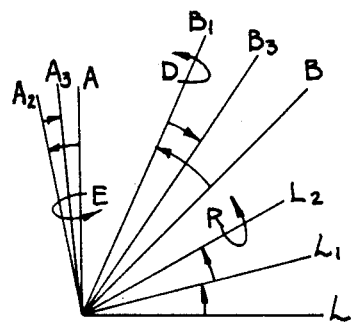
FIG. 4 is a schematic representation of the hand coordinate system and the orientation angles D, E, R.

The introduction of rotation at the axes of wrist 8 provides for orientation of a function element associated with tool 14 through the tool center point 18. FIG. 4 illustrates how the orientation angles are defined with respect to the hand coordinate system, having its origin at the center of wrist 8. The orientation angles D, E, and R define rotations relative to the hand coordinate system as follows:

(1) E is the magnitude of a rotation about A to align L and B with $L_1$, and $B_1$, respectively;
(2) D is the magnitude of a rotation about $B_1$ to align $L_1$ with $L_2$ and A with $A_2$; and
(3) R is the magnitude of a rotation about $L_2$ to align $B_1$ with $B_3$ and $A_2$ with $A_3$.

It will now be appreciated by one skilled in the art that, when the lengths M1, M2, and M3 are known, the position of tool center point 18 can be completely defined in all six degrees of freedom in terms of the three translation values X, Y, and Z and the three orientation angles D, E, and R.

In the control system of the present invention, when the manipulator 1 is being taught in the teach mode, the manipulator (world) coordinate system, X, Y, Z, D, E, R is used. Signals to the servo system of the present invention must be in terms of joint angle positions (i.e., motor positions), frequently termed "joint space". As a result, these signals are in terms of a, b, c, p1, p2, p3. As is known in the art, there are matrix transformation operations for transformations between X, Y, Z, D, E, R and a, b, c, p1, p2, p3.

The manipulator and its control having been briefly described, the manner in which the tool dimensions are determined can now be set forth. As indicated above, the tool dimension determination of the present invention is made up of two parts, an empirical or experimental part and an analytical part, both of which are performed in the teach mode.

The experimental procedure is performed first, and involves the establishment of a target point within the manipulator's working volume. As a first step of the experimental procedure, the operator should enter or select some initial L, A and B values for the tool, no particular values being required by the present invention. Then, using teach pendant 80, the manipulator operator causes the tool to approach the target point from four different directions. It is important that the four tool approach vectors not be coplanar. For example, the operator can cause the manipulator tool to approach the target point from the left side, from the right side, from the front and from the top. With each approach, the desired tool center point location 18 on the tool 14 should actually touch the target point.

The operator causes the X, Y, Z, D, E and R coordinates to be stored when the tool center point is at the target point for each of the four approaches. The control uses the operator entered tool dimensions in effecting motion of the manipulator members and, consequently, if the operator entered tool dimensions are correct, the four sets of X, Y, and Z coordinates will be identical. If the four sets of (X, Y, Z) values differ, which is likely, then the analytical portion of the tool dimension determination must be performed.

Figure 5A:
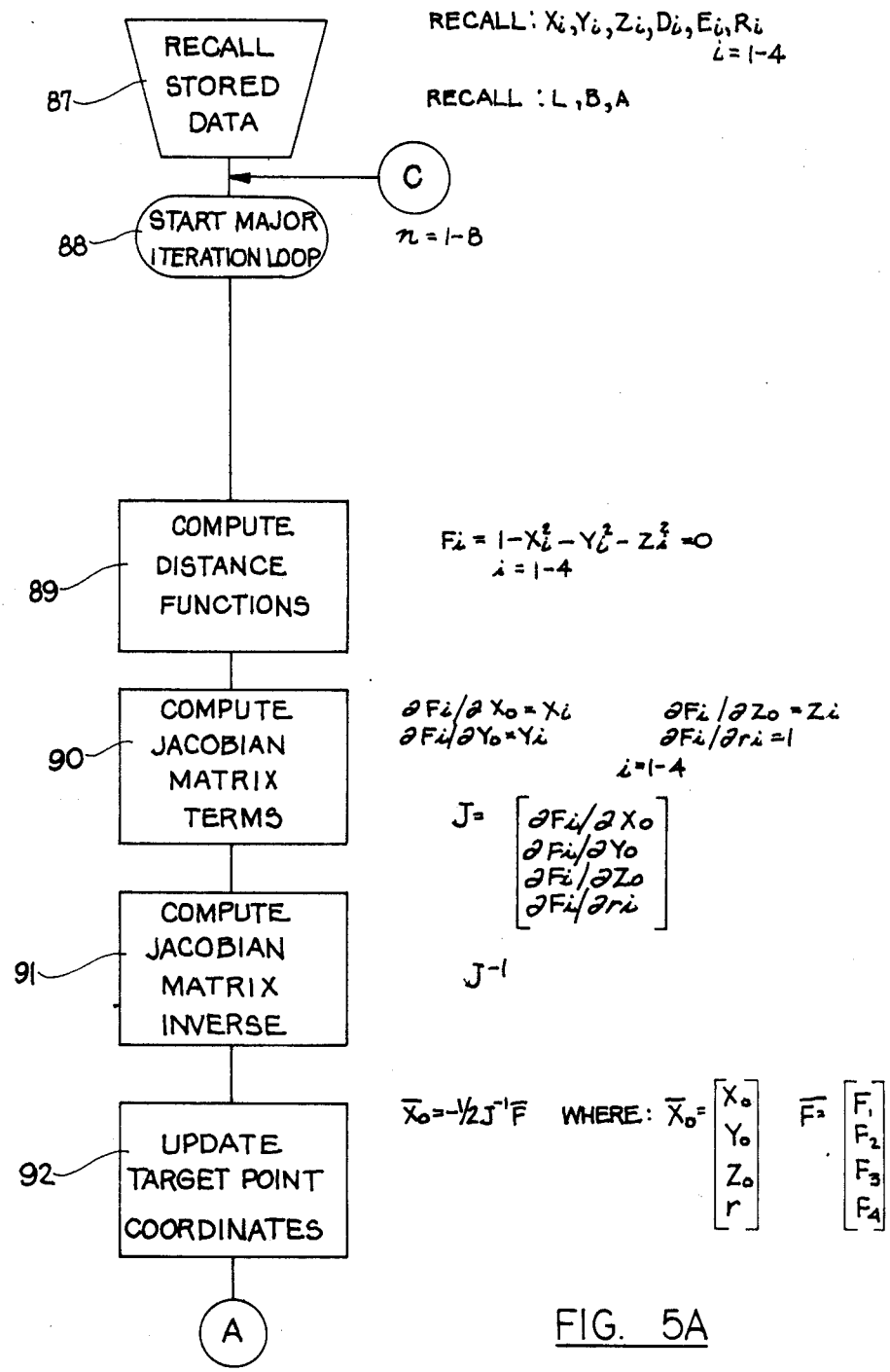
FIGS. 5A, 5B and 5C constitute a flow chart for the analytical portion of the tool dimension determination procedure.
Figure 5B:
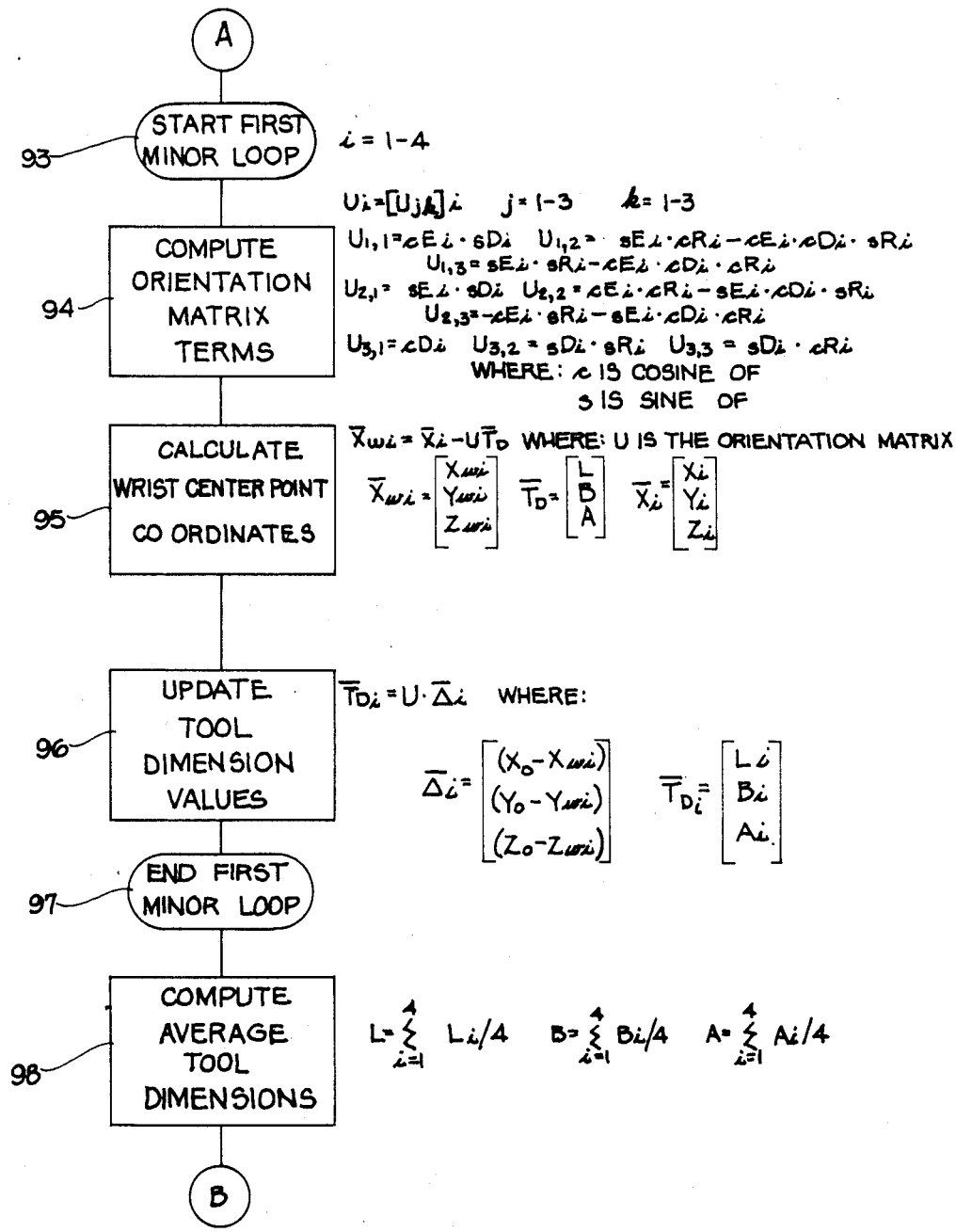
Figure 5C:
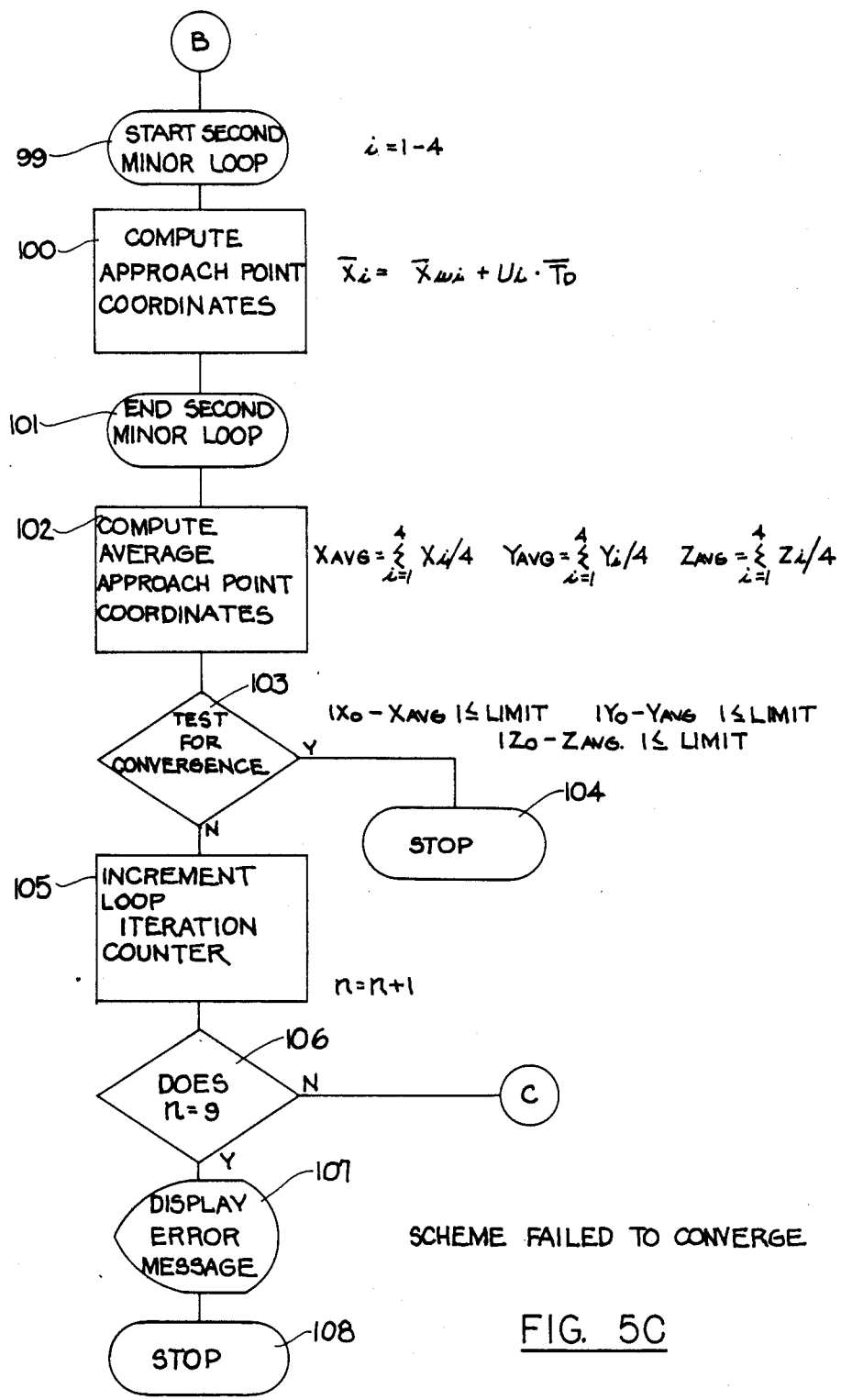

Reference is now made to FIGS. 5A, 5B and 5C which constitute the flow charts for programs executed by the control in performing the analytical portion of the tool dimension determination. The calculations are performed by the manipulator control in the teach mode, using data generated or entered by use of the pendant, and producing signals representing the values calculated.

Turning first to FIG. 5A, at process step 87 the stored data for the tool dimensions (L, B and A) are recalled together with the X, Y, Z, D, E, and R coordinates for the four approaches to the target point, defining four approach points. At process step 88, the major iteration loop is initiated. The major iteration loop is set up to be executed up to a maximum of eight times. This limit of up to eight times is an arbitrary limit which has been found to be sufficient.

At process step 89 the analysis proceeds using four distance functions of the form:

$$F_i = r_i^2 - (X_i - X_o)^2 - (Y_i - Y_o)^2 - (Z_i - Z_o)^2 = 0$$

where:
($X_o$, $Y_o$, $Z_o$) are the true world coordinates of the target point,
($X_i$, $Y_i$, $Z_i$) are the tool center point world coordinates of approach point i, and
$r_i$ is the distance from the target point to approach point i.

The analysis assumes the four points defined by the stored coordinates lie on the surface of a sphere having center $X_o$, $Y_o$, $Z_o$ and radius r. To simplify the mathematics, the unknown target point coordinates ($X_o$, $Y_o$, $Z_o$) are initialized to zero, and the distances $r_i$ are initialized to unity. This reduces the four distance functions to the form:

$$F_i = 1.0 - X_i^2 - Y_i^2 - Z_i^2$$

which are computed at step 89.

The well-known Newton-Raphson technique for solving non-linear simultaneous equations by iterative approximation can be applied to solve for the unknowns ($X_o$, $Y_o$, $Z_o$, and r).

The form of the solution is:

$$[\overline{X}_o]_n = [\overline{X}_o]_{n-1} - J^{-1}[\overline{F}]$$

where: $[\overline{X}_o]$ is a vector having components
$X_o$, $Y_o$, $Z_o$ and r;
n is the iteration index of the solution technique;
$[\overline{F}]$ is a vector of the functions $F_i$; and
J is the Jacobian of the $F_i$ functions.

The first iteration of the major iteration loop determines any translation of the center of the sphere from the four stored tool center point locations. Subsequent iterations determine coordinates of the center of the sphere using calculated values of both the tool dimensions and the coordinates of the approach points.

At process step 90, the Jacobian matrix terms are computed. The partial derivative of each function is computed with respect to $X_o$, $Y_o$, $Z_o$ and $r_i$. The multiplier "2" associated with each partial derivative has been dropped. Compensation for this is made later in the computations.

At process step 91, the inverse of the Jacobian matrix is computed using any general matrix inverse technique, as is well-known in the art.

At step 92, a new estimate for the coordinates of the target point is found by first taking the negative product of the Jacobian inverse and the function values. The resulting coordinate values are halved to compensate for the multiplier dropped in the computations of the Jacobian matrix terms.

Following determination of the sphere center point coordinates, $X_o$, $Y_o$, $Z_o$, the procedure continues with calculation of new tool dimensions for each approach to the target point using the calculated value of the sphere center point and the value of the coordinates of the approach points either as stored, in the case of the first iteration, or as calculated, in the case of subsequent iterations. The procedure for calculation of tool dimensions is shown in FIG. 5B.

Referring to FIG. 5B, at process step 93 the first minor iteration loop is started. Inside this iteration loop, new sets of tool dimension values and wrist center point coordinates are computed for each of the four approach points.

At process step 94, orientation matrix terms are computed and an orientation matrix $U_i$ is formed for the wrist orientation values $D_i$, $E_i$ and $R_i$ associated with each approach point.

At process step 95, the wrist center point location is computed for each approach point, using the recalled tool dimension values, L, B, A of step 87, along with the tool center point coordinates for each approach point and wrist orientation values. The calculation proceeds as a matrix multiplication defining a matrix of wrist center point coordinates by multiplying the wrist orientation matrix by the tool dimension vector and subtracting the product from the vector of the approach point coordinates. During the second and subsequent iterations, values for L, B, A are obtained from step 98, to be described hereinafter.

At process step 96, new tool dimension values are computed for each approach, using the wrist orientation values and wrist center point coordinates for each approach point (from process steps 94 and 95) along with the updated target point coordinates (from process step 92). At step 97, the first minor loop is terminated. At step 98, average tool dimensions are determined from the resulting sets of tool dimensions of process step 96 associated with the approach points.

Following completion of execution of the procedure of FIG. 5B, new values of coordinates of the approach points are calculated using the calculated tool dimensions and the stored orientation angles. The procedure for calculating these new approach point coordinates is shown in FIG. 5C.

Turning to FIG. 5C, process step 99 starts a second minor loop. Within this second iteration loop, the new tool dimensions are used to compute new tool center point coordinates for each approach vector.

In process step 100 new sets of coordinates for the approach points, represented by a vector designated $X_i$, are computed utilizing the new estimate of the tool dimension values derived in process step 98 along with wrist orientation values previously calculated and wrist center point location values calculated in process step 95. The new approach point coordinates, represented by the $X_i$ vector, are derived by adding to the wrist coordinates computed in process step 95 the product of the orientation matrix of process step 94 and the tool dimension vector with L, B and A values computed in process step 98. This having been accomplished, the second minor loop is ended at 101.

At process step 102, the average values of the approach point coordinates are determined from the values associated with each approach point, as determined in process step 100.

In decision step 103, each of the average approach point coordinates of process step 102 are compared with the updated target point coordinate values obtained from process step 92. If these values compare within a limit specified by the manipulator operator, the process is stopped as at 104. If the values do not compare within the user determined limit, the loop iteration counter is updated at 105 and decision step 106 comes into play. It will be remembered that the major iteration loop is set up to be executed a maximum of eight times. As a consequence, whenever the coordinates of the sphere center are not within the respective limit values of the approach points, decision step 106 will cause the major iteration loop to be repeated up to a maximum of eight times, starting with step 88.

Each time the major iteration loop is repeated, the various steps are performed in the same manner described above, with the exception that new tool dimension values (L, B, A) computed in process step 98 of the previous iteration are used in process step 95 of the present iteration and the approach point coordinates derived in process step 100 of the previous iteration are used in process steps 89 and 90 of the present iteration.

If, during the eighth iteration of the major loop satisfactory convergence is not obtained at decision step 103, then decision step 106 will cause an error message to be displayed at step 107 and further iteration of the major loop will be stopped at 108.

The number of major loop iterations required to achieve convergence at decision step 103 will depend, in part at least, on the care and accuracy exercised by the operator during the empirical phase. If convergence is not achieved after the eighth iteration of the major loop, the experimental portion of the tool dimension determination procedure should be repeated, followed by the analytical portion. When convergence is achieved within the user determined limit, the tool dimensions (L, B, A) determined at process step 98 will result in creation of manipulator programs free of coordinate errors caused by inaccurate tool dimensions.

Modifications may be made in the invention without departing from the spirit of it.

We claim:

1. A method for determining actual dimensions of a tool carried by a manipulator, the actual dimensions defining the location of a tool centerpoint relative to a tool coordinate system having an origin in a predetermined location relative to members of the manipulator, the manipulator effecting motion of the tool centerpoint in response to input signals defining locations of the tool centerpoint relative to a manipulator coordinate system and orientations of a tool coordinate vector terminating the tool centerpoint, the method comprising the steps of:
   a. storing input signals representing a set of initial values of the tool dimensions;
   b. placing the tool centerpoint at a target point;
   c. recording input signals representing a set of approach point coordinates and orientation angles defining the tool centerpoint location and the tool coordinate vector direction;
   d. changing the direction of the tool coordinate vector;
   e. repeating steps (c) and (d) to record at least four sets of approach point coordinates and orientation angles, at least one of the sets defining a tool coordinate vector direction noncoplanar with that defined by the other sets; and
   f. producing a set of tool dimension signals in response to the stored initial values and the stored sets of approach point coordinates and orientation angles.

2. The method of claim 1 wherein the step of producing a set of tool dimension signals further comprises the steps of:
   a. calculating values of coordinates of the target point in response to the stored sets of approach point coordinates;
   b. calculating values of coordinates of the origin of the tool coordinate system relative to the manipulator coordinate system for each approach point in response to the calculated values of the target point coordinates, the stored values of the orientation angles, and the stored values of the tool dimensions;
   c. calculating values of the tool dimensions in response to the calculated values of the target point coordinates and the calculated values of the coordinates of the origin of the tool coordinate system;
   d. calculating values of the approach point coordinates in response to the stored orientation angles and the calculated values of the tool dimensions;
   e. calculating differences between the calculated values of the target point coordinates and the calculated values of the approach point coordinates; and
   f. iterating the calculations of all of the steps (a) through (e), using in each subsequent iteration the calculated values of tool dimensions and the calculated values of the approach point coordinates of an immediately preceding iteration in place of the stored values thereof, until the differences between the calculated values of the target point coordinates and the calculated values of the approach point coordinates are less than respective predetermined limits.

3. The method of claim 2 wherein the step of calculating values of coordinates of the target point further comprises the steps of;
   (a) evaluating four predetermined functions relating the target point coordinates and the approach point coordinates, each function relating the target point coordinates to a single one of the sets of approach point coordinates; and
   (b) calculating values of the target point coordinates in response to the evaluated functions.

4. The method of claim 3 wherein the step of calculating values of the tool dimensions further comprises the steps of:
   a. calculating a plurality of sets of values of tool dimensions, each set of tool dimension values associated with a set of coordinates of the origin of the tool coordinate system; and
   b. calculating an average value of each tool dimension from a plurality of values, one value of each tool dimension drawn from each of the plurality of sets of values of tool dimensions.

5. The method of claim 4 wherein the step of calculating values of approach point coordinates further comprises the steps of:
   a. calcualting a plurality of sets of values of approach point coordinates, each set of values of approach point coordinates associated with a set of values of coordinates of the origin of the tool coordinate system and an associated set of orientation angles; and
   b. calculating an average value of each approach point coordinate from a plurality of values, one value of each approach point coordinate drawn from each of the plurality of sets of values of approach point coordinates.

6. The method of claim 5 further comprising the steps of:
   (a) counting the number of iterations of the steps;
   (b) ceasing the iteration of steps when the number of iterations reaches a predetermined limit and the differences between the calculated values of the target point coordinates and the calculated values of the approach point coordinates are not less than the respective limits; and
   (c) producing, in response to the cessation of iteration of steps prior to calculating differences less than the respective limits, an output signal indicating failure of the method to produce the set of tool dimension signals.

7. An apparatus for determining actual dimensions of a tool carried by a manipulator, the actual dimensions defining the location of a tool centerpoint relative to a tool coordinate system having an origin in a predetermined location relative to members of the manipulator, the manipulator effecting motion of the tool centerpoint in response to input signals defining locations of the tool centerpoint relative to a manipulator coordinate system and orientations of a tool coordinate vector terminating at the tool centerpoint, the apparatus comprising:
   a. means for storing input signals representing a set of initial values of the tool dimensions;
   b. means for placing the tool centerpoint at a target point with the tool coordinate vector at a desired direction;
   c. means for recording input signals representing a set of approach point coordinates and orientation angles defining the tool centerpoint location and the tool coordinate vector direction;
   d. means for producing a set of tool dimension signals in response to the stored initial values and at least four sets of stored approach point coordinates and orientation angles, each set defining the tool centerpoint coordinates at the target point with a tool coordinate vector direction different from that of the other sets, at least one set defining a tool coordinate vector direction noncoplanar with the direction defined by the other sets.

8. The apparatus of claim 7 wherein the means for producing tool dimension signals further comprises:
   a. means for calculating coordinates of the target point in response to the stored sets of approach point coordinates;
   b. means for calculating a set of values of coordinates of the origin of the tool coordinate system relative to the manipulator coordinate system for each approach point in response to the calculated values of the target point coordinates, the stored values of the orientation angles, and the stored vales of the tool dimensions;
   c. means for calculating values of the tool dimensions in response to the calculated values of the target point coordinates and the calculated values of coordinates of the tool coordinate system;
   d. means for calculating values of the approach point coordinates in response to the stored orientation angles and the calculated values of the tool dimensions;
   e. means for calculating differences between the calculated values of the target point coordinates and the calculated values of the approach point coordinates; and
   f. means for iteratively approximating the actual values of the tool dimensions by causing repetitive execution of calculations by the means (a) through (e), using in each subsequent iteration the calculated values of tool dimensions and the calculated values of the approach point coordinates from an immediately preceding iteration in place of the stored values thereof, until the differences between the calculated values of the target point coordinates and the calculated values of the approach point coordinates are less than respective predetermined limits.

9. The apparatus of claim 8 wherein the means for calculating coordinates of the target point further comprises:
   (a) means for evaluating four predetermined functions relating the target point coordinates and the approach point coordinates, each function relating the target point coordinates to a single one of the sets of approach point coordinates; and
   (b) means for calculating values of the target point coordinates in response to the evaluated functions.

10. The apparatus of claim 9 wherein the means for calculating values of the tool dimensions further comprises:
   a. means for calculating a plurality of sets of values of tool dimensions, each set of values of tool dimensions associated with a set of coordinates of the origin of the tool coordinate system; and b. means for calculating an average value of each tool dimension from a plurality of values of each tool dimension, one value of each tool dimension drawn from each of the plurality of sets of tool dimension values.

11. The apparatus of claim 10 wherein the means for calculating values of approach point coordinates further comprises:

a. means for calculating a plurality of sets of values of approach point coordinates, each set of values of approach point coordinates associated with a set of values of coordinates of the origin of the tool coordinate system and an associated set of orientation angles; and b. means for calculating an average value of each approach point coordinate from a plurality of values thereof, one value of each approach point coordinate drawn from each of the plurality of sets of approach point coordinates.

12. The apparatus of claim 11 further comprising:

(a) means for counting the number of iterations of the calculations;

(b) mean responsive to the counting means for ceasing the iteration of calculations when the number of iterations reaches a predetermined limit and the difference between the calculated values of the target point coordinates and the calculated values of the approach point coordinates are not less than the respective limits; and (c) means for producing, in response to the cessation of iteration of calculations prior to the calculation of differences less than the respective limits, an output signal indicating failure of the apparatus to produce the set of tool dimension signals.

* * * * *